June 10, 1958        T. GEORGI        2,838,326

SEMITRAILER COUPLING-PIN LOCKING MECHANISM

Filed April 3, 1957        2 Sheets-Sheet 1

INVENTOR:
THEODOR GEORGI

By *[signature]*

HIS AGENT

June 10, 1958 T. GEORGI 2,838,326
SEMITRAILER COUPLING-PIN LOCKING MECHANISM
Filed April 3, 1957 2 Sheets-Sheet 2

INVENTOR:
THEODOR GEORGI
By [signature]
HIS AGENT

United States Patent Office 2,838,326
Patented June 10, 1958

2,838,326

SEMITRAILER COUPLING-PIN LOCKING MECHANISM

Theodor Georgi, Hilden, Rhineland, Germany, assignor to Jost Werke Josef Steinfass G. m. b. H., Neu-Isenburg, Germany, a corporation of Germany Application April 3, 1957, Serial No. 650,332

9 Claims. (Cl. 280—434)

The invention relates to a semitrailer coupling which forms a detachable biaxial articulated connection between a tractor and a trailer and wherein a coupling pin may be locked in a movable pin engaging member.

The principal object of the invention is to obtain an automatic, accident-proof engagement of the coupling and, by simple means, a flexibility between the tractor and trailer on a smooth road as well as in rough country.

As is well known, for example when the tractor is being coupled to the trailer in difficult country or where conditions are cramped, it frequently occurs that, after the introduction of the coupling pin into the coupling plate, oppositely directed forces act on the trailer before the pin has reached its end position and, as a result, the pin re-emerges from the entry slot without completing the coupling process, which frequently leads to accidents to the operator.

It is, therefore, an object of the invention to provide a coupling which will be secure against disengagement when the coupling pin is in the entry slot in the coupling plate and before the pin has reached the end position.

Furthermore, according to one feature of the invention, it is possible to effect the closure and the locking of the coupling automatically, even when the coupling pin comprises worn areas. In the latter case, there are provided means for adjustment, so as to obtain a positive coupling whatever the state of the pin.

Finally, it is important that the traction transmitted by the coupling should not be transmitted through a hinge pin because, after being in service for only a short time, this generally becomes deformed as a result of the shock loads so that there is inadequate contact in the coupling and loud rattling noises occur.

It is a further object of the invention to prevent heavy moments of torsion about the longitudinal axis of the vehicle occurring on relative movement between the trailer and the tractor because, in practice, fractures frequently occur as a result of this.

These and other advantages are achieved by the invention by providing a movable, lockable support for the coupling pin consisting of a spring-loaded transverse bolt which cooperates with the pivoting hook by means of wedge surfaces which jam in the closed position when the hook engages the pin, the pivotal axis of the hook lying on that side of the entry slot for the pin on which there is a bolt support. The wedge surfaces further serve to clamp the hook and the bolt when the coupling is in a preparatory position.

Further advantages and features of the invention are disclosed in the following description which relates to certain preferred embodiments illustrated by way of example in the accompanying drawing but to which the invention is not limited. In the drawing, Fig. 1 is a top view of one embodiment of a semitrailer coupling according to the invention, partly cut away;

Figure 1:
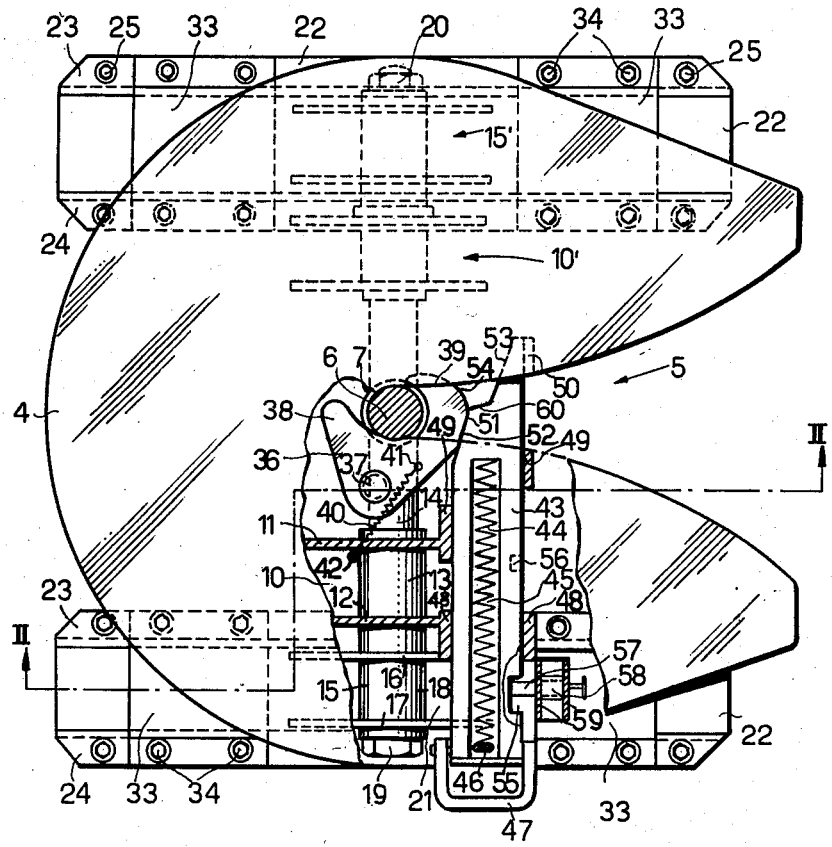
Figure 2:
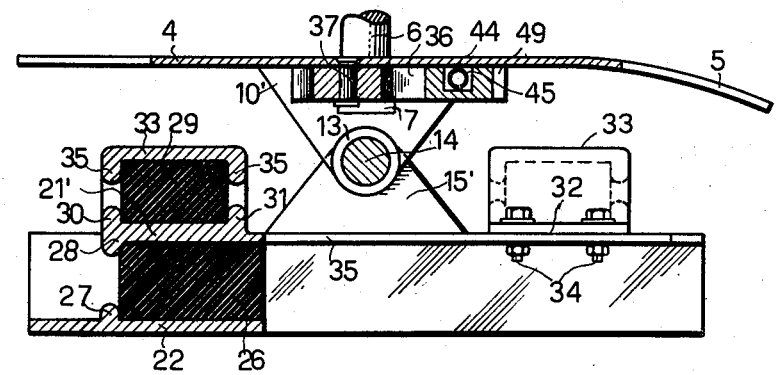
Fig. 2 is a section on line II—II of Fig. 1.

Referring now to Figs. 1 and 2, there is shown a platform 4 with a rearwardly extending, dove-tailed entry slot 5 which serves to receive the coupling pin 6. Head 7 is provided on pin 6.

The platform is mounted on bearing brackets 10 and 10', each bracket consisting of two ribs 11 and 12 which are connected with the platform and in which the bearing sleeves 13 are journaled. Bearing shaft 14 is positioned in the bearing sleeves and forms the pivot axis of platform 4.

The platform bearing shaft 14 is mounted on a tractor chassis by means of two bearing brackets 15 and 15' which are positioned laterally offset and outside the bearing brackets 10 and 10', each bracket 15, 15' consisting again of two ribs 16 and 17 in which the bearing sleeves 18 are journaled. Shaft 14 is positioned in bearing sleeves 18 and is provided with head 19 on one end while the other end is secured by means of nut 20. The ribs, 16, 17 of the bearing brackets 15 and 15' are connected, respectively, to bearing plates 21 and 21' which (see Fig. 3) are resiliently mounted in respective bearing housings. Each housing consists of a channel-shaped support member 22 with longitudinal flanges 23 and 24 which are secured to the chassis by bolts 25. As shown in Fig. 1, the bearing housings are positioned on each side of the plane of symmetry of the coupling. A rubber or like resilient cushion 26 is positioned in each channel-shaped member 22 to support the respective bearing plates 21 and 21'. The assembly is held in position by beads 27 and 28 provided on member 22 and plate 21 (or 21'), respectively. A further resilient cushion 29 of rubber, for instance, is mounted at each end of the bearing plates 21 and 21' between beads 30 and 31 and is held on the plates by means of bridge 33 whose flanges 32 are bolted at 34 to flanges 35 in the upper portion of the channel-shaped member 22. The cushion 29 is held in position in the bridge 22 by beads 35.

The pivotable platform 4 carries on its underside the pivotable hook 36 which is fulcrumed on bolt 37. The pin-engaging member 36 has two extensions 38 and 39, the arcuate extension 39 forming a hook which engages coupling pin 6 far beyond its diameter to lock the pin in position while extension 38 is constructed as a follower element which moves within reach of the pin when the member 36 is pivoted about bolt 37, as will be described more fully hereinafter in connection with Figs. 3 and 4.

The pin-engaging member 36 is loaded by relatively weak spring 40 which is secured to member 26 at 41 while its other end is fixed to a pin 42 mounted on the underside of platform 4. In its open position, the hook 36 is held in one end position by the pull of spring 40. The spring 40 may be replaced by any equivalent mechanical means, such as a spring-loaded latch and the like.

To secure the hook 36 in its closed position in engagement with coupling pin 6, as illustrated in Fig. 1, there is provided a sliding bolt 43 which is held in the closed position by spring 44 mounted in recess 45 of the bolt and abutting shoulder 46 provided on the underside of the platform. Bolt 43 is slidably mounted in guides 48 and 48' and may be moved by handle 47. If desired, mechanical, hydraulic and similar remote control means may be used to actuate sliding bolt 43.

The sliding bolt is supported in the direction of the pivoting movement of hook 36 by guides or rails 49 and 50 which are positioned at respective sides of the platform entry slot 5. The bolt has a wedge surface 51 which engages a corresponding wedge surface 52 of the pin-engaging member 36 when the coupling is in closed position. The sliding bolt is secured in its end positions by recesses 55 and 56 which cooperate with the spring latch 57 in respective ones of the end positions. The latch 57 may be operated manually or automatically and is slidably supported in sleeve 58 which is journaled in ribs 59 secured to the underside of platform 4. The recess 55 is wider than the latch 57, providing play for the latch so that an automatic adjustment of the closed end position (Fig. 1) is possible.

Figure 3:
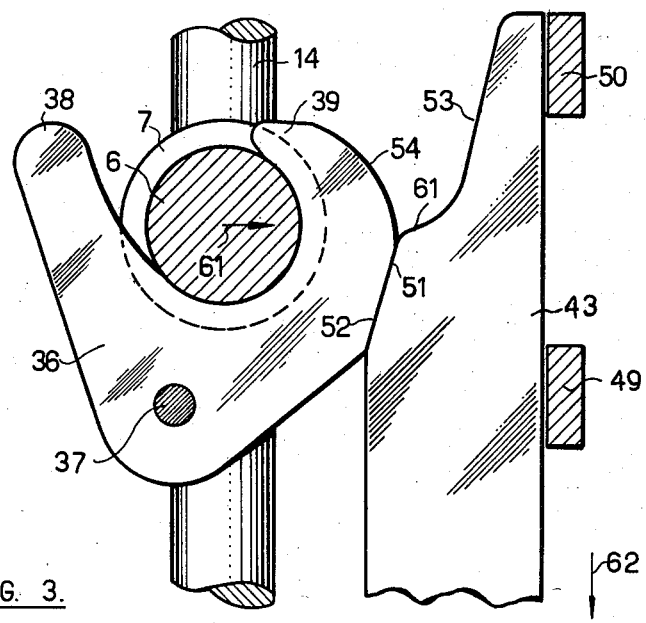
Figs. 3 and 4 are enlarged top views of the coupling in different operating positions.

The operation of the coupling is best explained in connection with Figs. 3 and 4. Fig. 3 illustrates the closed position shown in Fig. 1 in which the arcuate hook extension 39 of the member 36 fully engages the circumference of coupling pin 6. The bolt is in its safety position, i. e. it is supported on one side by rims 49 and 50 and engages the surface 52 of member 36 with its wedge surface 51 on the other side. This will maintain the hook securely in its closed position because the wedge surfaces 51 and 52 are so arranged and dimensioned that a force extending in the direction of arrow 61 cannot dislodge the bolt from its locking position. In other words, the coupling will be automatically jammed in its locked position. In addition, the previously mentioned end position latch means works in the same direction and reinforces the locking force. Accordingly, the pulling force exerted upon coupling pin 6 will be transmitted directly from the pin to hook 36, bolt 43, rims 49 and 50 to platform 4 without causing any load on pivot bolt 37 of hook 36.

When it is desired to disengage the coupling, the bolt 43 is moved in the direction of arrow 62 and the pin-engaging member 36 is free to pivot about bolt 37 while coupling pin 6 is removed from coupling part 4 through slot 5.

Figure 4:
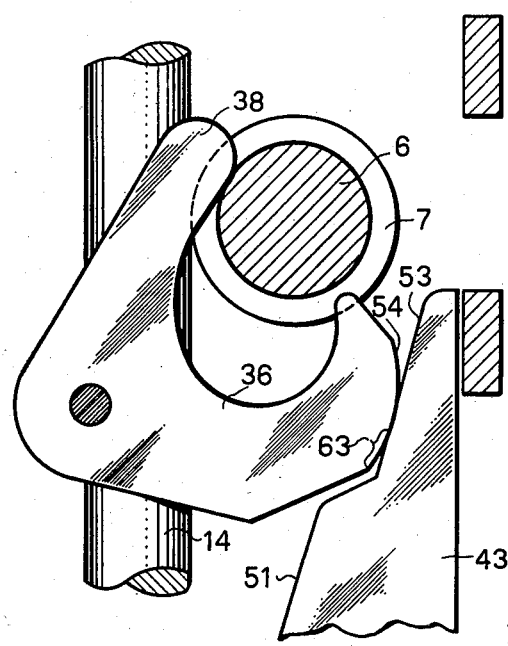

Coupling of the tractor and trailer is illustrated in Fig. 4. First, the latch 57 is released and the bolt 43 will be propelled by spring 44 in the direction counter arrow 62 until its advance wedge surface 53 reaches hook 36. The bolt surface 53 cooperates with or engages the arcuate surface 54 of the hook and pivots the hook counter-clockwise against the force of spring 40 until the bolt 43 is jammed in a coupling readiness position, as shown in Fig. 4 where the surfaces 53 and 54 are adjacent one another. In this position, the coupling pin is introduced into slot 5 of platform 4 until it touches follower element 38 of pin-engaging member 36. Upon further movement of the pin, the member 36 will be pivoted counter-clockwise out of the jammed position of Fig. 4 into the locked position of Fig. 3. This is possible because the arcuate surface 54 is relieved in zone 63 so that it can be released from wedge surface 53. Upon further rotation of member 36, the bolt wedge surface 51 of the automatically following bolt begins to engage surface 52 of hook 36 so that the extension 39 provisionally locks the pin before the same has reached its end position. Thus, a backward sliding of coupling pin 6 attached to trailer 8 is no longer possible even in this position. In its end position, the coupling pin 6, hook 36 and bolt 43 have reached the position of Fig. 3, the spring latch 57 has engaged recess 55 of the bolt and the coupling is secured in closed position.

While bolt wedge surfaces 51 and 53 have been shown connected by step 60, it would also be possible gradually to merge the two surfaces.

What I claim is:

1. A coupling constituting a detachable, biaxial, articulated connection between two coupling parts, comprising a coupling pin secured to one of said parts and a pin locking assembly secured to the other part, said assembly comprising a platform having an entry slot for the pin, a pivotable pin-engaging member, a pivot mounting said member on the platform, a transversely movable spring-loaded bolt mounted on the platform for cooperation with said member, cooperating wedge surfaces on said member and said bolt for locking the pin-engaging member around the pin in an end position of the bolt, and a bolt support mounted on the platform, the pin-engaging member pivot and the bolt support being arranged on the same side of the pin entry slot.

2. The coupling of claim 1, wherein the cooperating wedge surfaces are shaped to jam the bolt and pin-engaging member in an intermediate position of the bolt.

3. The coupling of claim 2, wherein the cooperating wedge surfaces on the pin-engaging member and on the bolt have respective cooperating zones, and end zone being shaped to jam the bolt and the member in the intermediate position and an inner zone for locking the pin-engaging member around the pin.

4. The coupling of claim 3, wherein the end zone of the wedge surface of the pin-engaging member is an arcuate surface having an eccentric portion connecting it with the inner zone of the wedge surface.

5. The coupling of claim 1, wherein the cooperating wedge surfaces are shaped to jam the bolt and pin-engaging member in an intermediate position, the pin-engaging member having a follower element actuatable by the pin inserted in said entry slot whereby the member is pivoted by the pin out of said intermediate position.

6. The coupling of claim 1, comprising bolt locking means arranged to lock the bolt in said end position, the locking means having a clearance permitting further movement of the bolt in the direction of the end position.

7. A coupling constituting a detachable, biaxial, articulated connection between two coupling parts, comprising a coupling pin fixedly secured to one of said parts and a pin locking assembly secured to the other part, said assembly comprising a transverse support shaft, bearing means for pivotably mounting said support shaft, means for resiliently securing the shaft bearing means to said other part, a platform fixed to said pivotable support shaft, said platform having a longitudinal entry slot for the coupling pin, a pivotable pin-engaging member having a hook-shaped extension for engaging the pin, said extension having an outer wedge surface, a pivot mounting the pin-engaging member on the platform, a transversely movable spring-loaded bolt mounted on the platform for cooperation with the pin-engaging member, a wedge surface at one extremity of the bolt for cooperation with the wedge surface of the pin-engaging member in an end position of the bolt, and a bolt support mounted on the platform, the pin-engaging member pivot and the bolt support being arranged on the same side of the pin entry slot.

8. The coupling of claim 7, wherein the cooperating wedge surfaces have two respective cooperating zones, the wedge surface zones on the bolt being inclined planes and the wedge surface zones of the pin-engaging member consisting of an arcuate end zone having an eccentric portion and an adjoining flat zone, the arcuate zone cooperating with one of said inclined planes on the bolt in an intermediate position of the bolt to jam the bolt and the pin-engaging member and the flat zone cooperating with the other inclined plane on the bolt in the end position for locking the pin-engaging member with its hook-shaped extension around the pin.

9. The coupling of claim 8, wherein the pin-engaging member has a follower element actuatable by the pin inserted in said entry slot whereby the member is pivoted by the pin out of said intermediate into the end position.

References Cited in the file of this patent
UNITED STATES PATENTS

| | | |
|---|---|---|
| 2,031,256 | Dorsey | Feb. 18, 1936 |
| 2,100,463 | Wohlfarth | Nov. 30, 1937 |
| 2,353,267 | Reid | July 11, 1944 |
| 2,618,488 | Ketel | Nov. 18, 1952 |